United States Patent [19]

Kurimoto et al.

[11] 3,881,991

[45] May 6, 1975

[54] PROCESS FOR PRODUCING AMYLOSE POWDERS HAVING A MEAN DEGREE OF POLYMERIZATION BETWEEN 20–30

[75] Inventors: Masashi Kurimoto; Kaname Sugimoto, both of Okayama, Japan

[73] Assignee: Hayashibara Company, Okayama, Japan

[22] Filed: Aug. 24, 1972

[21] Appl. No.: 283,392

Related U.S. Application Data

[63] Continuation of Ser. No. 5,907, Jan. 26, 1970, abandoned.

[30] Foreign Application Priority Data

Jan. 24, 1969 Japan.................................. 44-5125

[52] U.S. Cl................................ 195/31 R; 127/32
[51] Int. Cl........................... C10d 13/04; C13l 1/08
[58] Field of Search.......... 195/7, 11, 31, 66; 127/32

[56] References Cited

UNITED STATES PATENTS

| | | | |
|---|---|---|---|
| 3,067,067 | 1/1960 | Etheridge et al. | 127/71 |
| 3,532,602 | 10/1970 | Seidman | 195/31 |
| 3,560,345 | 2/1971 | Yokobayashi et al. | 196/66 |
| 3,730,840 | 5/1973 | Sugimoto et al. | 195/31 R |

OTHER PUBLICATIONS

Harada et al., Applied Micro, Vol. 16, pp. 1439–1444, 1968.

Banks et al., Die Starke, Vol. 67, pp. 197–206, 1967.

*Primary Examiner*—David M. Naff
*Assistant Examiner*—Thomas G. Wiseman
*Attorney, Agent, or Firm*—Browdy & Neimark

[57] ABSTRACT

Process for producing powdery amyloses having excellent solubility, adsorption and other properties, by hydrolyzing a gelatinized starch solution with isoamylase to a straight-chain amylose solution, slowly cooling said solution thereby forming a crystalline precipitate, and then drying the precipitate by spraying at a low temperature.

7 Claims, No Drawings

PROCESS FOR PRODUCING AMYLOSE POWDERS HAVING A MEAN DEGREE OF POLYMERIZATION BETWEEN 20-30

This is a continuation, of application Ser. No. 5,907, filed Jan. 26, 1970, now abandoned.

This invention provides a process for producing powdery amyloses having excellent solubility, adsorption and other properties, by hydrolyzing a gelatinized starch solution with isoamylase to a straight-chain amylose solution, slowly cooling said solution thereby forming a crystalline precipitate, and then drying the precipitate by spraying at a low temperature.

The invention will be more particularly described hereunder. Manufacture of straight-chain amylose from starch is accomplished, as disclosed in detail in the specification of U.S. patent application Ser. No. 810,314 now U.S. Pat. No. 3,730,840, by liquefying a starch slurry either at a high temperature of 160°C or with the use of a liquefying enzyme to a low dextrose equivalent (in the range of 0.5 to 2), and then allowing an enzyme, e.g., the isoamylase produced by the bacteria of Pseudomonas amyloderamosa (A.T.C.C. No. 21262) or the pullulanase produced by Aerobacter aerogenes (A.T.C.C. No. 8724), that hydrolyzes the α-1,6-glucoside bonds of amylopectin to act in such a manner as to hydrolyze the branches of the branched structure of amylopectin into straight molecules of amylose type. In this way a low-molecular amylose composed mainly of a polymer having mean degree of polymerization of about 30 to 20 is obtained. This substance has been confirmed through end-group measurement by periodic acid oxidation method to have, for the most part, polymerization degree of about 20 to 30. It has also been confirmed by Smith's decomposition method that the substance is an amylosic polysaccharide practically free from branches. Thus, in the form of an aqueous solution, it has considerable solubility with relatively low viscosity. It exhibits a threading tendency rather than the starchy viscousness as is naturally expected from the molecular structure. Also in an aqueous solution it turns bluish upon a color reaction with iodine, thus indicating that the substance has a helical molecular structure, and it precipitates at low temperatures. X-ray diffraction shows that the substance has a crystal structure on drying. The present inventors have therefore investigated the feasibility of drying the amylose to powdery state while keeping it as crystalline as possible.

As a way of drying such a liquefied starch the drying by hot roll as in the preparation of gelatinizedstarch may appear feasible. However, the substance under consideration, which has too much a water content to resist gelatinization on heating, dries only with a low efficiency and, once gelatinized, it has such an irregular molecular orientation that it must be reground before being solidified. In addition, redissolution is highly difficult. On the other hand, the amylose precipitated from reaction solution has a too high water content for smooth dehydration and requires much heat for drying purposes. Great difficulties are also involved in washing with water, separation or filtration of the precipitate. It is therefore essential to separate amylose from water and scour and purify the amylose in the form of crystals, thereby decreasing the water content of the product. This was realized in two ways. In one approach, an amylose-butanol complex was formed and precipitated by adding butanol, an organic acid or the like to amylose. To be more exact, a 5 to 15 percent solution of amylose was heated to upwards of 80°C for uniform dissolution, and then butanol was added to a saturation point. The mixture was slowly cooled over a period of 20 hours and the butanol complex was precipitated. Thus a crystalline precipitate having a small water content and which was readily separable from water was obtained. After the removal of the supernatant fluid by a centrifuge, a pure amylose complex was left behind. The other method consisted of the following steps. An amylolyzed starch solution at a concentration of 10 to 20 percent was heated to more than 100°C and a thoroughly dispersed, homogeneous solution was prepared. It was cooled as slowly as possible, and the resulting crystalline precipitate was centrifuged, and the supernatant fluid was heated again for dissolution, and then the solution was slowly cooled and centrifuged before complete gelling took place. The resultant had a water content of less than 80 percent and had such low viscosity that could facilitate subsequent treatment. The formation of crystalline precipitate by this method was particularly easy when the isoamylase produced by bacteria of the genus Pseudomonas was used. The amylose precipitates formed by both of the procedures above described were sprayed by means of a high-pressure pump from the top of a drying column through a nozzle or via a rotary disk. The drying air temperature was at less than 100°C and the amylose temperature was maintained under the temperature of 45°C to avoid gelatinization or dissolution.

The powders thus obtained were white starch powders with very small apparent specific gravity, and their water contents were not more than 10 percent. X-ray diffraction showed that the products were porous, crystalline powders having considerable crystallinity. Especially the dry powder of the butanol complex appeared to retain much of the helical crystalline structure of the original amylosic substance.

As regards moisture absorption in the air, tests indicated that the powders slowly absorb water at relative humidities of over 80 percent, and they begin to absorb odors as well. Because of these properties the powders appear to be effective as porous adsorbents. As for solubility in water, the powders are faster to disperse and dissolve in water than those obtained by usual processes and are easier to form homogeneous solutions, for great convenience in dissolution and gelatinization. Ordinary products dried as by hot rolls are very hard and difficult to dissolve. They have great specific gravity and have very poor flavor-retaining quality and solubility. Moreover, high heat used for the drying purpose causes partial decomposition and degradation of amylose and makes it impossible to form pure products of uniform quality. The amylose powders prepared by spray drying in accordance with the present process are porous solids free from the foregoing disadvantages. With relatively large surface areas, the powders according to the invention take the form best suited for the synthesis of amylose derivatives through vapor phase reactions.

As repeatedly stated hereinabove, the present invention provides a process for easily manufacturing porous amylose powders, in essence, by precipitating amylose in crystalline form and drying the precipitate quickly but without increasing the powder temperature by spray drying, if necessary under vacuum, so that the products can retain the crystallinity.

EXAMPLE 1

Waxy corn starch at a concentration between 5 and 10 percent was rapidly heated to 155°C with stirring to form a completely homogeneous gelatinized solution. It was sprayed into vacuum at 50°C for quick cooling. Immediately upon cooling, isoamylase (pullulanase as described in the specification of U.S. patent application Ser. No. 733,325, now U.S. Pat. No. 3,622,460, was added for a reaction with pH 6.0 for 30 hours. Then, the resultant was heated to 120°C with stirring to a homogeneous solution, and the solution was cooled slowly over a period of 12 to 24 hours. The low-molecular-weight amylose contained deposited as crystalline powder and could be centrifugally separated. A slurry of the precipitate having a water content of 75 percent was sprayed by means of a high-pressure pump from the upper part of a drying column through a nozzle. The drying column had an effective height of 15 meters, and dry air at an inlet temperature of not higher than 100°C was forced in a downward stream into the column. The output temperature was kept below 60°C and the material temperature below 40°C. The powder obtained was fine, porous and lightweight, practically globular in shape. The product was readily soluble in warm water and absorbed little water but had a flavor-retaining quality.

EXAMPLE 2

In the same manner as described in Example 1 gelatinization and hydrolysis were carried out and butanol was dissolved to a saturation point in the amylolyzed starch solution so prepared. The mixture was cooled from 80°C over a period of 20 hours, and a crystalline amylosebutanol complex resulted. It was deposited as a relatively dry and crisp precipitate. It could be easily filtered or centrifugally precipitated. A slurry concentrated and separated by centrifugal precipitation was directly sent by means of a high-pressure pump onto a rotary disk, at a liquid temperature of not higher than 40°C, and was thereby sprayed into the drying column from the upper part thereof. The drying conditions were similar to those adopted in Example 1. A lightweight powder resulted, which showed good water-solublity and great gas- or liquid-absorbability. An analysis by X-ray difflux indicated that there is a large portion of amylose having a helical molecular structure in the product.

EXAMPLE 3

Potato starch was purified and a 20 percent starch slurry was prepared. With the addition of 0.1 percent of a liquefying amylase the slurry was continuously liquefied at 90°C. While keeping the D.E. below 1, the liquefied starch was quickly cooled to 50°C, and the isoamylase produced by the bacteria of the genus Pseudomonas (as described in the specification of U.S. patent application Ser. No. 733,326, now U.S. Pat. No. 3,560,345, was added, and then for 40 hours the mixture was allowed to react, with pH 5.0 and at 45°C. The reacted solution was thoroughly dispersed at 100°C and was slowly cooled to deposit amylose crystals. The precipitate thus obtained had particularly good crystallinity as compared with those formed by the use of other enzymes, and was easy to precipitate and filtrate. The resulting precipitate and the precipitate formed by four-to-one concentration of the mother liquor were separately recrystallized, separated into portions of long-chain molecules and short-chain ones, and then the two were dried by spraying in the manner described. Lightweight amylose powders resulted.

EXAMPLE 4

Waxy corn starch was gelatinized at an elevated temperature in the same way as in Example 1, and was hydrolyzed with the isoamylase produced by the bacteria of the genus Pseudomonas to obtain amylose of short-chain molecules having chain lengths in the range of 20 to 30. The resultant was concentrated to one-third in volume and precipitated at 100°C over several 10 hours. A precipitate having a little water content was obtained. After the centrifugal precipitation, the supernatant fluid was removed and the precipitate containing amylose crystals was sprayed by means of a high-pressure pump into a drying column through a nozzle, while care was taken not to increase the liquid temperature, and thus the precipitated crystals were dried up to fine powder.

We claim:

1. A process for producing amylose powders of crystalline helical structure and low water content having a mean polymerization degree of 20 – 30 and having good solubility and flavor-retaining properties, comprising gelatinizing a starch slurry, hydrolyzing the branches of amylopectin with an enzyme that hydrolyzes the alpha-1,6-glucoside bonds of amylopectin until an amylosic starch having a mean polymerization degree of 20 – 30 is obtained, precipitating the amylose to the form of a helical cyrstalline precipitate having a low water content and a mean polymerization degree of 20 – 30, partially dehydrating the precipitate, and thereafter, with a material temperature of less than 45°C., spray drying the partially dehydrated precipitate to a powdery form.

2. A process according to claim 1 wherein the precipitation of the helical crystalline amylose is by the use of butanol as a precipitant.

3. A process according to claim 1 wherein the precipitation of the helical crystalline amylose is by slowly cooling.

4. A process according to claim 1 wherein the partial dehydrating of the helical crystalline precipitate is by precipitation.

5. A process according to claim 1 wherein the partial dehydrating of the helical crystalline precipitate is by centrifugal separation.

6. A process in accordance with claim 1 wherein said starch slurry is a waxy corn starch slurry.

7. Spray dried powdery helical crystalline amylose having a mean polymerization degree of 20–30 produced by the process of claim 1.

* * * * *